US009696423B2

(12) United States Patent
Martin

(10) Patent No.: US 9,696,423 B2
(45) Date of Patent: Jul. 4, 2017

(54) METHOD FOR IMPROVING PERFORMANCE OF A SODAR SYSTEM

(71) Applicant: Andrew Louis Martin, Ferny Creek (AU)

(72) Inventor: Andrew Louis Martin, Ferny Creek (AU)

(73) Assignee: WINDBIDCO PTY LTS, Ferny Creek (AU)

( * ) Notice: Subject to any disclaimer, the term of this patent is extended or adjusted under 35 U.S.C. 154(b) by 140 days.

(21) Appl. No.: 14/432,450

(22) PCT Filed: Oct. 2, 2013

(86) PCT No.: PCT/AU2013/001128
§ 371 (c)(1),
(2) Date: Mar. 30, 2015

(87) PCT Pub. No.: WO2014/053013
PCT Pub. Date: Apr. 10, 2014

(65) Prior Publication Data
US 2015/0241561 A1  Aug. 27, 2015

(30) Foreign Application Priority Data
Oct. 2, 2012  (AU) ................................ 2012904289

(51) Int. Cl.
G01S 15/88   (2006.01)
G01S 15/34   (2006.01)
G01S 7/52    (2006.01)
G01S 7/534   (2006.01)
(Continued)

(52) U.S. Cl.
CPC ........ *G01S 15/885* (2013.01); *G01S 7/52003* (2013.01); *G01S 7/534* (2013.01); *G01S 7/536* (2013.01); *G01S 15/34* (2013.01); *G01S 15/586* (2013.01)

(58) Field of Classification Search
CPC .. G01S 7/52003; G01S 15/885; G01S 15/586; G01S 7/534; G01S 15/34; G01S 7/536
See application file for complete search history.

(56) References Cited

U.S. PATENT DOCUMENTS 4,960,329 A * 10/1990 Schofield ................ G01S 7/486
                                                              367/102
2015/0241561 A1 * 8/2015 Martin ................ G01S 7/52003
                                                              367/100

FOREIGN PATENT DOCUMENTS

WO    2006089371    8/2006

OTHER PUBLICATIONS

Bradley, S. G. "Use of Coded Waveforms for SODAR Systems" Meteorology and Atmospheric Physics 71, pp. 15-23, 1999.
(Continued)

Primary Examiner — Daniel Pihulic
(74) Attorney, Agent, or Firm — Hovey Williams LLP

(57) ABSTRACT

A method is disclosed for improving performance of a Sodar system adapted to locate discontinuities in the atmosphere by transmitting pulse compression signals such as plural acoustic chirps. The method comprises transmitting the acoustic chirps, receiving acoustic echoes of the chirps, and processing the acoustic echoes to provide an indication of the discontinuities, wherein the processing includes correcting range or resolution error associated with the acoustic echoes.

18 Claims, 11 Drawing Sheets

(51) Int. Cl.
*G01S 7/536* (2006.01)
*G01S 15/58* (2006.01)

(56) References Cited

OTHER PUBLICATIONS

The International Search Report and Written Opinion dated Nov. 12, 2013, in PCT/AU2013/001128, filed Oct. 2, 2013.

* cited by examiner

METHOD FOR IMPROVING PERFORMANCE OF A SODAR SYSTEM

RELATED APPLICATIONS

This is a national stage application under 35 U.S.C. §371 of International Application No. PCT/AU2013/001128, filed Oct. 2, 2013, which claims the priority of Australian Patent Application No. 2012904289, filed Oct. 2, 2012. The disclosures of the above-referenced applications are hereby incorporated into the present application by reference in their entireties.

CROSS REFERENCE TO RELATED APPLICATIONS

The present invention is related to the following international patent applications, the disclosures of which are incorporated herein by cross reference.

PCT1—AU01/00247 entitled Acoustic Sounding
PCT2—AU02/01129 entitled Measurement of Air Characteristics in the lower atmosphere
PCT3—AU2004/000242 entitled Improved Sodar Sounding of the lower atmosphere
PCT4—AU2004/001075 entitled Detection of Wake Vortices and the like in the lower atmosphere
PCT5—AU2006/000245 entitled Characterization of Aircraft Wake Vortices
PCT6—AU2006/000247 entitled Staged Sodar Sounding
PCT7—AU2006/000818 entitled Sodar Sounding of the Lower Atmosphere

TECHNICAL FIELD

The present invention relates to the field of Sodar systems for use in atmospheric sounding and in particular relates to a method for improving performance of a Sodar system.

BACKGROUND TO THE INVENTION

Sodar systems as described in the patent applications listed above use pulse compression of acoustic signals (preferably acoustic chirps) that have a relatively wide bandwidth (when compared to conventional short pulse SODAR systems) to obtain vertical wind speed and direction as well as large and small scale turbulence.

Use of relatively wideband acoustic chirps in Sodar systems (to realize full advantages of pulse compression) provides many potential advantages over conventional short pulse single frequency systems including increased gain and better resolution but also introduces several problems. The problems arise directly from the use of wide bandwidth acoustic chirps and the resulting Doppler shift of return signals.

Known problems resulting from the use of wideband acoustic chirps include:
i) increasing range error as wind speed increases due to Doppler shift; and
ii) loss of resolution as wind speed increases due to differential Doppler shift.
iii) differential attenuation of the atmosphere at different frequencies such that a single wideband chirp would incur greater loss at higher frequencies and the advantage of using a wide band chirp would be lost.
iv) Decorrelation of a return signal when reflection of the return signal is from different patches of turbulence.

As may be seen from the above, it is the very attribute of a pulse compression signal that provides increased system gain and good resolution at very low wind speeds that also reduces performance of the Sodar system in higher wind speed. Use of a wideband chirp may also be of limited value because of a loss of processing gain due to greater attenuation of the chirp at higher frequencies especially at lower humidity.

The parameters of wide bandwidth pulse compression chirp Sodar typically include a transmitted audio frequency chirp that increases linearly from about 1 kHz to 3 kHz over a period of several seconds. Chirp transmit signals that linearly decrease from about 3 kHz to 1 kHz (reverse chirp) may also be used with only a change in the signs of the equations being necessary to describe this operation. For the purpose of describing operation of the system, only linearly increasing (or decreasing) chirps will be described herein. In order to obtain a useable range for the Sodar, a receive period may be several seconds longer than the period of the transmitted signal, so that complete chirps may be received from a distance which is determined by the receive period.

For instance if a chirp is transmitted for 5 seconds and a range of 1000 m is required then the receive time must allow for complete chirp signals to travel up and back, a distance of 2000 m. This implies that total receive time for such a system should be about 6 seconds (assuming a speed of sound of 340 m/s) plus transmit time giving a total receive time of 11 seconds. The range R is obtained from time using the equation $$R = ct_R/2 \qquad (1)$$

wherein c is the speed of sound in air and $t_R$ is the range time being the time taken for a transmitted signal to travel up and back, after the end of a transmit pulse.

The transmitted signals are reflected back from atmospheric discontinuities such as turbulence during daytime or by molecular scattering at night. The returned signals thus include a continuous set of the transmitted chirp signals reflected from the atmosphere which is a continuous target.

The method of the present invention may include transmitting into the atmosphere acoustic chirps such as 200 Hz each, having a relatively wide bandwidth in total (eg. 2 kHz), for a period of say up to but not limited to 10 seconds.

The chirp signals returned from the atmosphere are received at some later time and may be passed through a matched filter as shown in FIG. 1. Estimates of the received signal phase and amplitude may be obtained from real and imaginary parts associated with the received signal.

Doppler phase information is indicative of radial wind velocity and may allow signal amplitude and phase outputs to be shifted to their correct location to compensate for range errors.

Resolution errors may be corrected by taking the first received Doppler phase signal at each of a number of range segments. The first received Doppler phase may be used to estimate the amount of frequency shift in the received signal at any given range so as to construct a new chirp that is representative of the actual Doppler shift. The new chirp may then be used to reprocess the received signals at any given range to improve the resolution of the system.

Chirps having an increasing or decreasing frequency may be used without any loss of generality in the above description. Indeed, an increasing frequency chirp may be transmitted on one beam with a decreasing frequency chirp transmitted on another beam simultaneously. The arrangement may be further exploited by using chirps of different frequencies. Both forward and reverse chirps may be transmitted simultaneously on several beams to greatly speed up acquisition of wind data. For instance, 4 chirps may be transmitted simultaneously in the following manner on 4 different beams, East 1 kHz to 2.5 kHz, West 2.5 kHz to 1 kHz, South 3 kHz to 4.5 kHz, North 4.5 kHz to 3 kHz. In this way a complete set of wind vectors can be obtained in one transmit-receive cycle instead of having 4 transmit-receive cycles if just one increasing frequency chirp is used.

The processing of the simultaneous multiple chirps may include passing each forward and reverse frequency segment through a respective matched filter and correcting range error for each output from each respective matched filter. The chirps transmitted on substantially opposite beams may then be subtracted after correcting the range error.

This arrangement is particularly advantageous as simultaneous measurement of all wind vectors minimizes error due to measuring at different times wherein the wind may have changed between measurements.

By subtracting opposite vectors (North-South and East-West) after error correction, horizontal wind components (North South component and East West component) may be obtained. Actual wind speed and direction may then be easily obtained.

Furthermore, if opposite beams are added a vertical wind speed is obtained for each of the North South and East West beams. As two sets of vertical wind speed are obtained it may be a simple matter to compare each of the North South and East West vertical wind speeds to provide a quality control process, if the North South and East West beams are working correctly the vertical wind speed from each of the North South and East West additions should be the similar.

A reference herein to a patent document or other matter which is given as prior art is not to be taken as an admission that that document or matter was known or that the information it contains was part of the common general knowledge as at the priority date of any of the claims.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

SUMMARY OF THE INVENTION

According to one aspect of the present invention there is provided a method of improving performance of a Sodar system adapted to locate discontinuities in the atmosphere by transmitting pulse compression signals such as plural acoustic chirps, said method comprising: transmitting the acoustic chirps; receiving acoustic echoes of the chirps; and processing the acoustic echoes to provide an indication of said discontinuities; wherein said processing includes correcting range error associated with the acoustic echoes.

The bandwidth of each chirp may be 200 Hz and the bandwidth of the plural chirps may be 2 kHz in total.

The step of correcting range error may be performed at each of a plurality of range segments. The method may include adding together outputs of the corrected range segments to provide a corrected range profile. The processing may include correcting resolution error associated with the acoustic echoes. The step of correcting resolution error may be performed at each of a plurality of range segments. The method may include adding together outputs of the corrected resolution segments to provide a corrected range and resolution profile.

According to a further aspect of the present invention there is provided a method of improving performance of a Sodar system adapted to locate discontinuities in the atmosphere by transmitting pulse compression signals such as plural acoustic chirps, said method comprising: transmitting the acoustic chirps; receiving acoustic echoes of the chirps; and processing the acoustic echoes to provide an indication of said discontinuities; wherein said processing includes correcting resolution error associated with the acoustic echoes.

The bandwidth of each chirp may be 200 Hz and the bandwidth of the plural chirps may be 2 kHz in total.

The step of correcting resolution error may be performed at each of a plurality of range segments. The method may include adding together outputs of the corrected resolution segments to provide a corrected resolution profile.

The processing may include passing each range segment through a respective matched filter and correcting range error for each output from each respective matched filter.

Each matched filter may provide an amplitude and Doppler phase output. The method may include the step of shifting each amplitude and Doppler phase output to its correct range.

The method may include the step of aligning the amplitude and Doppler phase outputs from each matched filter after range correction.

According to a still further aspect of the present invention there is provided a method of improving performance of a Sodar system adapted to locate discontinuities in the atmosphere by transmitting pulse compression signals such as plural acoustic chirps, said method including: transmitting said acoustic chirps in plural frequency segments; receiving echoes of said acoustic chirps in plural frequency segments; processing each frequency segment to provide an output for each segment; and summing said outputs of said frequency segments to provide an indication of said discontinuities.

The bandwidth of each chirp may be 200 Hz and the bandwidth of the plural chirps may be 2 kHz in total.

The processing may include passing each frequency segment through a respective matched filter and correcting range error for each output from each respective matched filter. The chirps may be transmitted on opposite beams to enable subtraction of the opposite beams after correcting the range error. The chirps transmitted on opposite beams may include forward and reverse chirps. Alternatively, forward and reverse chirps may be transmitted on multiple beams and on different frequency bands.

Each matched filter may provide an amplitude and Doppler phase output. The method may include shifting each amplitude and Doppler phase output to its correct range.

The method may include the step of aligning the amplitude and Doppler phase outputs from each matched filter after range correction.

DESCRIPTION OF DRAWINGS

A preferred embodiment of the present invention will now be described with reference to the accompanying drawings wherein.

DESCRIPTION OF A PREFERRED EMBODIMENT OF THE INVENTION

Figure 1:
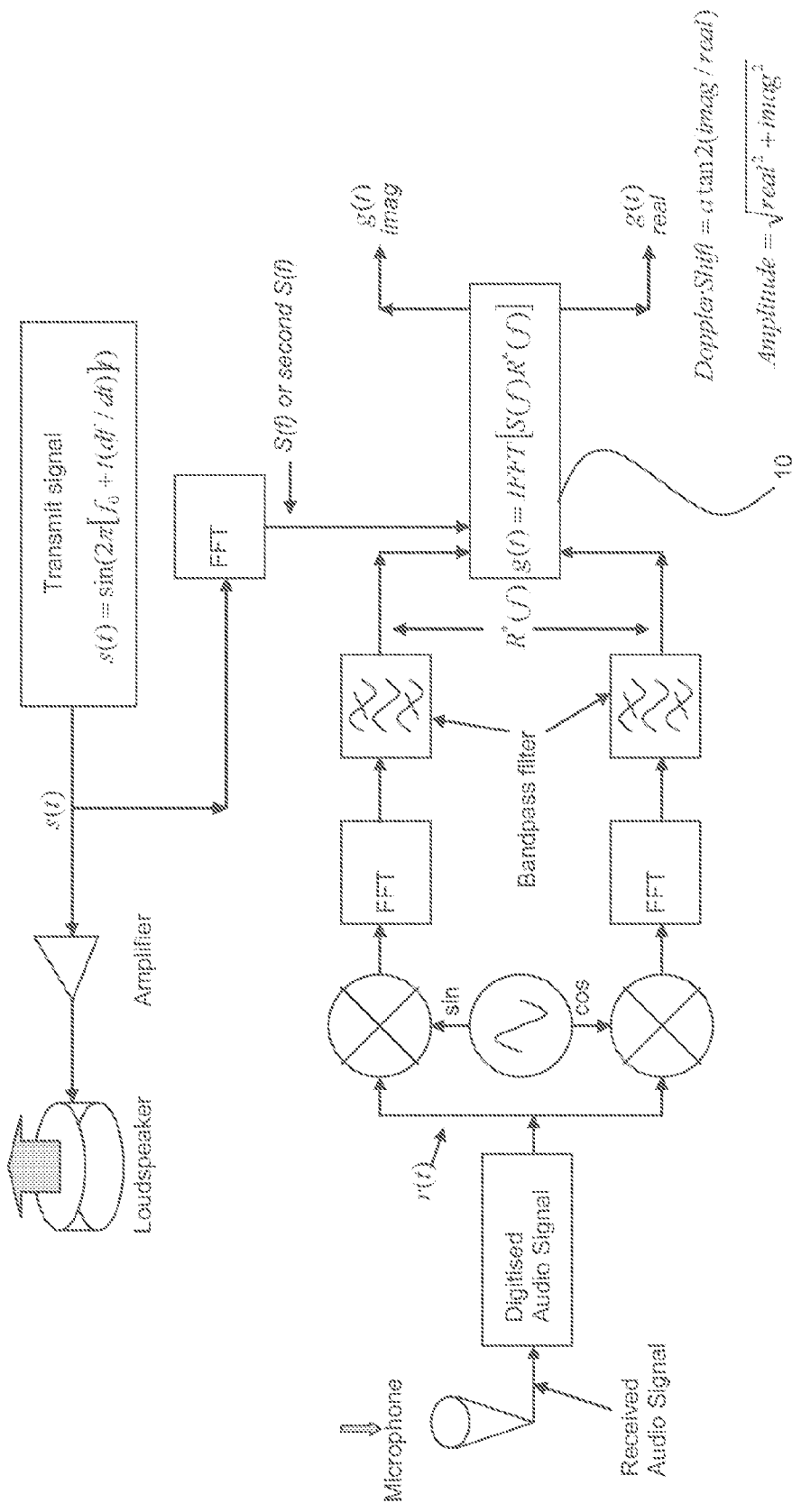
FIG. 1 shows a generic pulse compression Sodar system that uses acoustic chirp signals suitable for locating discontinuities in the atmosphere.
Figure 5:
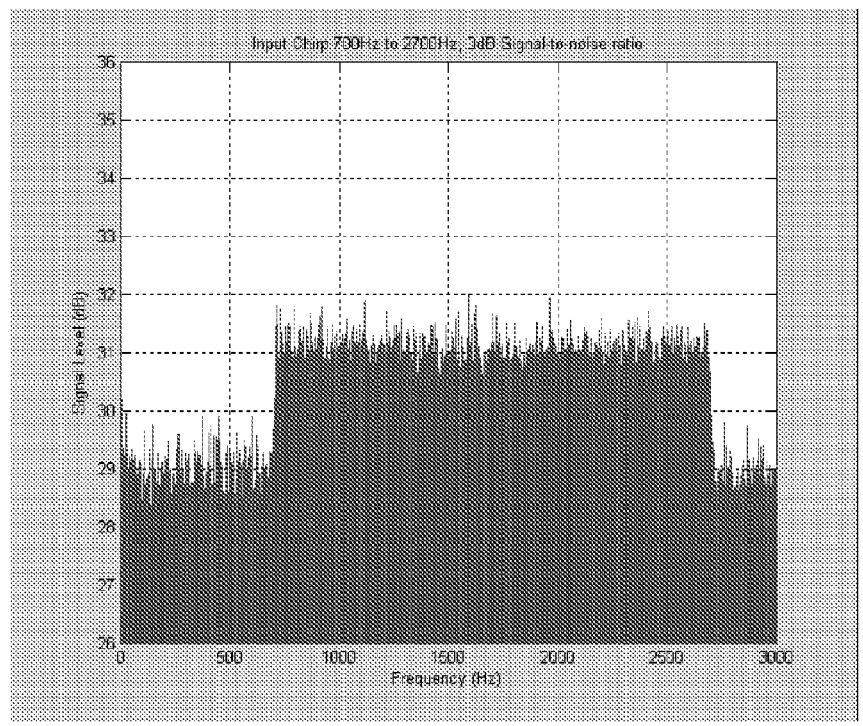
FIG. 5 shows a frequency spectrum associated with an input chirp signal, 700 Hz to 2.7 kHz.
Figure 6:
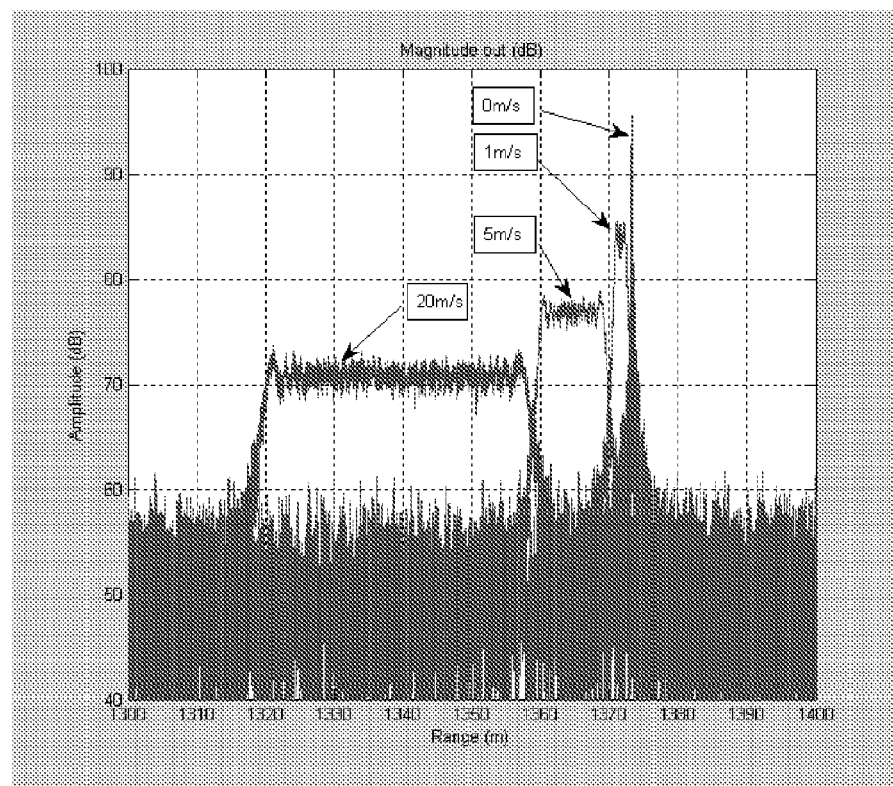
FIG. 6 shows range and resolution errors for horizontal wind speeds of 0 m/s, 1 m/s, 5 m/s and 20 m/s with a 15 degree antenna offset angle.

FIG. 1 shows a generic pulse compression arrangement for using chirp signals in a Sodar system as described in applicants patent applications listed above using signals with a frequency spectrum as shown in FIG. 5. The output of a generic Sodar system is shown in FIG. 6 for a selection of wind speeds.

Referring to FIG. 1, a chirp signal s(t) comprising an audio signal that increases in frequency over time is generated and amplified before application to a loudspeaker and reflector system which directs acoustic energy upwards. The acoustic energy is reflected from discontinuities in the atmosphere. The reflected energy including the acoustic chirp signal is received by a microphone and reflector system. The received signal is then digitized and split into two streams for digital processing. Each stream is multiplied in the time domain by sine and cosine functions from a local oscillator respectively. This converts the real received audio stream into real and imaginary parts. The received signals are then transformed into the frequency domain wherein a reversed frequency component (lower side band) is selected by a low frequency bandpass filter while a high frequency component is rejected before being passed to a pulse compression matched filter 10. The matched filter multiplies a Fourier transformed copy of the transmitted signal (forward frequency sense) with a reversed frequency copy of the received signal selected by the lower side band filter. The upper sideband could alternatively be selected by a filter wherein a reversed copy of the transmitted chirp would be used as an input to the matched filter. An inverse Fourier transform then converts the signals back to the time domain, wherein each sample represents a point of distance from the receiver. Spacing of the points also depends on sampling rate of the digitized audio input. Amplitude and phase components as a function of height may then be readily obtained from real and imaginary outputs of the pulse compression matched filter.

Matched filter 10 is preferably implemented in the frequency domain to minimize computation demands and provide a total Doppler shift and amplitude in each range gate as a function of height g(t) following an inverse Fourier transform (IFFT) from the following equation $$g(t)=\text{IFFT}[S(f)R^*(f)] \quad (2)$$

wherein S(f) is the Fourier transform (FFT) of the transmitted signal s(t) and R*(f) is the complex conjugate of the Fourier transform of the received signal r(t). In this case the property of $$R^*(f)=R(-f) \quad (3)$$

for a real received signal is used.

Figure 2:
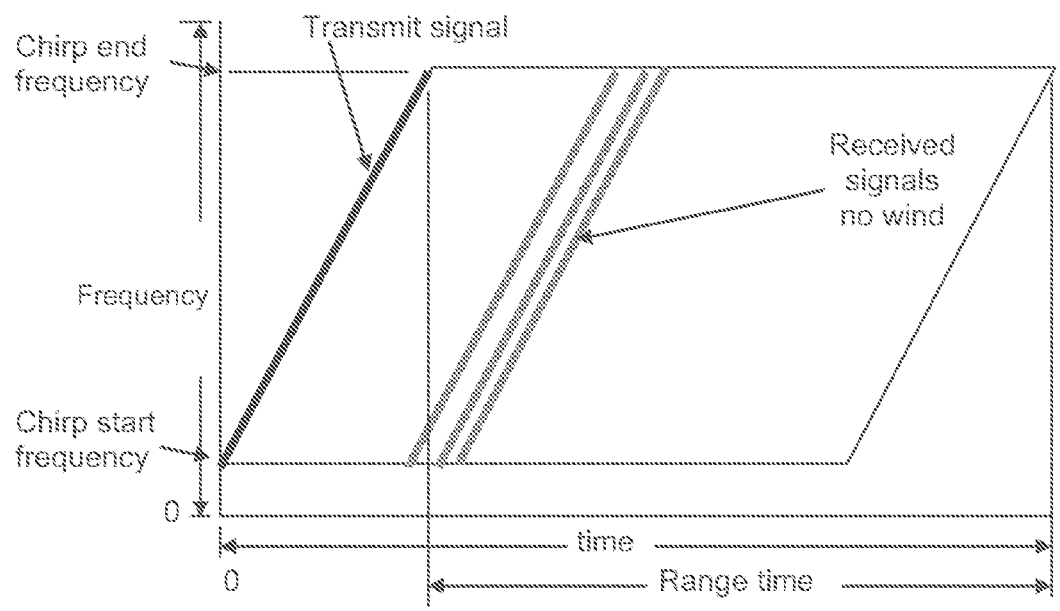
FIG. 2 shows a general arrangement of the transmitted chirp and continuous received signals.

FIG. 2 shows a general arrangement of a transmitted chirp signal and continuous received signals. Several received signals are enhanced to show that it is returned at a time delayed from the transmitted signal. The time delay after the end of the transmitted chirp signal represents range.

To obtain wind speed to 1000 m acoustic energy may be focused by antenna arrays or reflector antennas in an upwards direction. To obtain a measure of horizontal wind the beams should be tilted away from the vertical (typically by 10 or more degrees) so as to measure a component of horizontal wind by measuring its Doppler shift.

Figure 3:
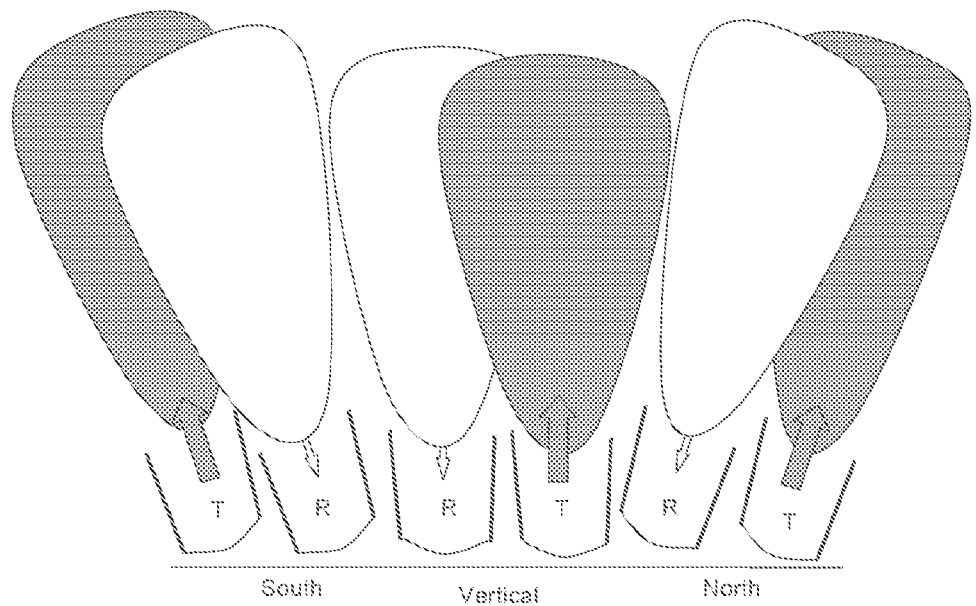
FIG. 3 shows an arrangement of beams of a chirp Sodar to obtain the North, South and vertical components of wind in the atmosphere.

The general arrangement is shown in FIG. 3. Also shown is a vertical beam which may be used to obtain a vertical component only of the wind. Separate transmit and receive antennas are preferably used in order to avoid overload of the receiver that is operating while the transmitter is sending. The receiver preferably operates while the transmitter is sending in order to obtain near range information as described in the patent applications listed above.

FIG. 3 shows an arrangement of beams of a chirp Sodar to obtain the North, South and vertical components of wind in the atmosphere. East and West beams may also be used to obtain the East and West Components of the wind. Parabolic reflector antennas are typically used for the receivers and transmitters in this arrangement. Many other arrangements of antennas are also possible.

The amount of Doppler shift depends on the transmitted frequency, the wind speed and the angle of the transmitted signal. The Doppler frequency shift $f_D$ of the return signal for each receive antenna is given by the equation;

$$f_D = f_R + f_{NI} + 2\pi v_R f_C/c \quad (4)$$

wherein the radial wind $v_R$ component is calculated from the vertical and horizontal wind components using $$v_R = (v_H \sin \alpha + v_v \cos \alpha) \quad (5)$$

wherein $f_R$ is a frequency component introduced by a complex receiver (the complex receiver is used to obtain Doppler phase components of the wind), $f_{IN}$ is a noise and interference component, $\alpha$ is the receive antenna vertical offset angle, $v_H$ is a horizontal wind speed component, $v_v$ is a vertical wind speed component, c is the speed of sound in air and $f_C$ is the center frequency of the chirp given by $$f_C = (f_S + f_E)/2 \quad (6)$$

and wherein $f_S$ is the start frequency of the chirp and $f_E$ is the end frequency of the chirp (FIG. 2). Equation (4) shows that a zero wind produces a zero Doppler shift.

To obtain accurate horizontal wind information for each beam all other components should be removed. The vertical wind component may be removed by subtracting a measure of the vertical wind obtained from the vertical beam, the frequency component introduced by complex receiver can be calculated from the receiver topology, and the antenna offset angle is known. After obtaining the wind speed component in each beam it is a relatively simple matter to obtain the horizontal wind direction by the use of vectors.

System gain $G_S$ for a complex receiver is given by the equation $$G_S = 10 \log 10(Bt_T) + 3 \text{ dB} \quad (7)$$

wherein $t_T$ is length of the transmitted chirp and B is chirp bandwidth. The range error $R_E$ is given by the equation $$R_E \approx -v_R f_C t_T / B \quad (8)$$

wherein $v_R$ is the radial velocity of the wind and $f_C$ is the centre frequency of the chirp.

The resolution RE of the system with no Doppler shift is given by the equation $$RE = c/2B \quad (9)$$

The resolution error $RE_E$ is dependent on radial wind velocity and is given by the equation $$RE_E \approx 2 * t_T * v_R \quad (10)$$

A typical system uses a transmit pulse of 5 seconds, a chirp going from 700 Hz to 2.7 KHz, and a bandwidth of 2 KHz.

The Doppler shift function a tan 2 used in FIG. 1 provides an estimate of the Doppler phase shift over the range of phase of $+-\pi$ only, and is the Doppler shift at that range. The Doppler shifts at each range should thus be added up from the start of the range time (refer FIG. 2) to obtain a total Doppler shift to every height $\Phi_D$.

Once the Doppler shift is added up, it is converted into a radial wind velocity $v_R$ at each range point using the equation $$v_R = \Phi_D c / 2\pi t_T f_C \quad (11)$$

wherein $\Phi_D$ is the Doppler shift obtained as set out above.

The Doppler frequency shift of return chirp signal $f_D$ due to the Doppler shifted return phase signal at the chirp centre frequency is given by $$f_D = \Phi_D / 2\pi t_T \quad (12)$$

The system dependent phase component is also included in the Doppler shift output $\Phi_D$ and should be removed before the Doppler shift due to the radial wind speed can be obtained. The system dependent phase shift component $\Phi_S$ is calculated from the equation $$\Phi_S = 2\pi t_T f_C \quad (13)$$

The range offset errors for each frequency segment may be calculated using equations 8 and 11. Equations 8 and 11 may then be used to calculate a range error for each respective range segment.

The present invention may address issues discussed above by using radial wind speed information to correct the range error. In one embodiment the radial wind speed information may be used in conjunction with equation 6 to calculate an estimate of range error at any given range and then shift the received signal back to a correct range position.

The processing may include segmenting the amplitude and phase output from the matched filter into several range gates by the using the complete received signal as input to the matched filter and segmenting the amplitude and phase output from the matched filter into several range gates or segmenting the received signals into several time sections and inputting these segments to the matched filter so as to obtain a segmented output amplitude and phase at several range gates.

The average wind within a range gate may then be used to calculate the actual range error. The range error may then be used to shift the data at that range back to the correct range position. The processing may include interpolating between range gates so as to smooth out residual range errors enabling a whole range of the profiler to be corrected.

Figure 16:
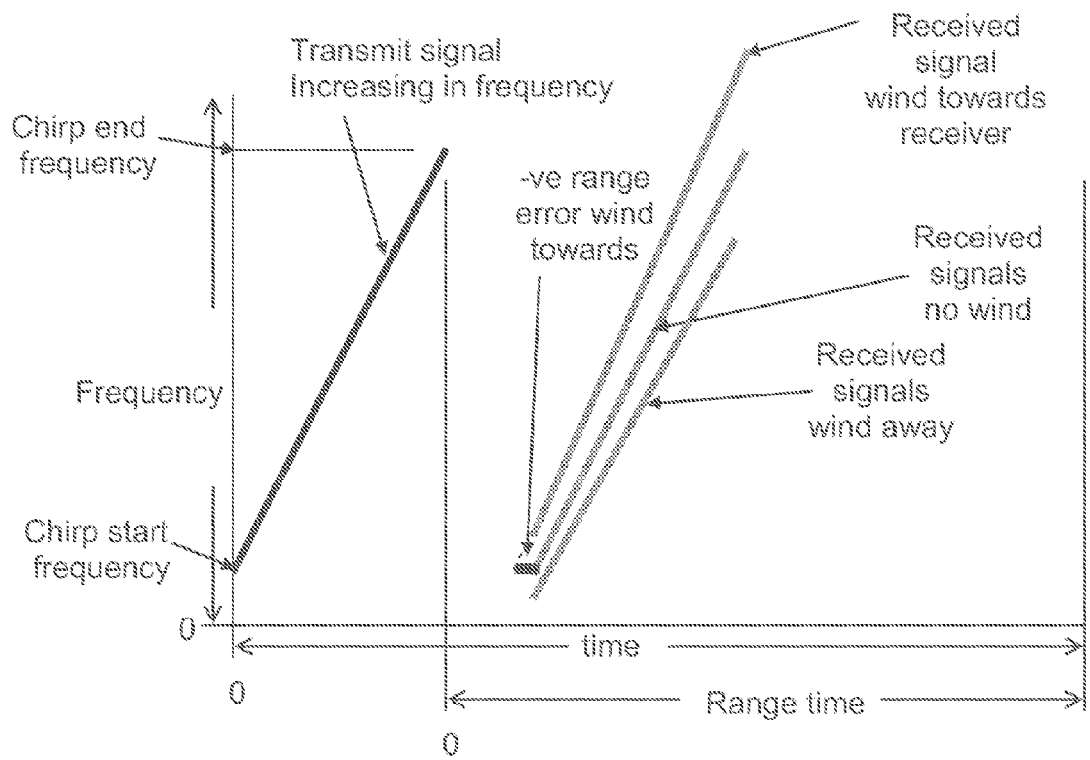
FIG. 16 shows a forward chirp and the associated range and resolution errors.
Figure 17:
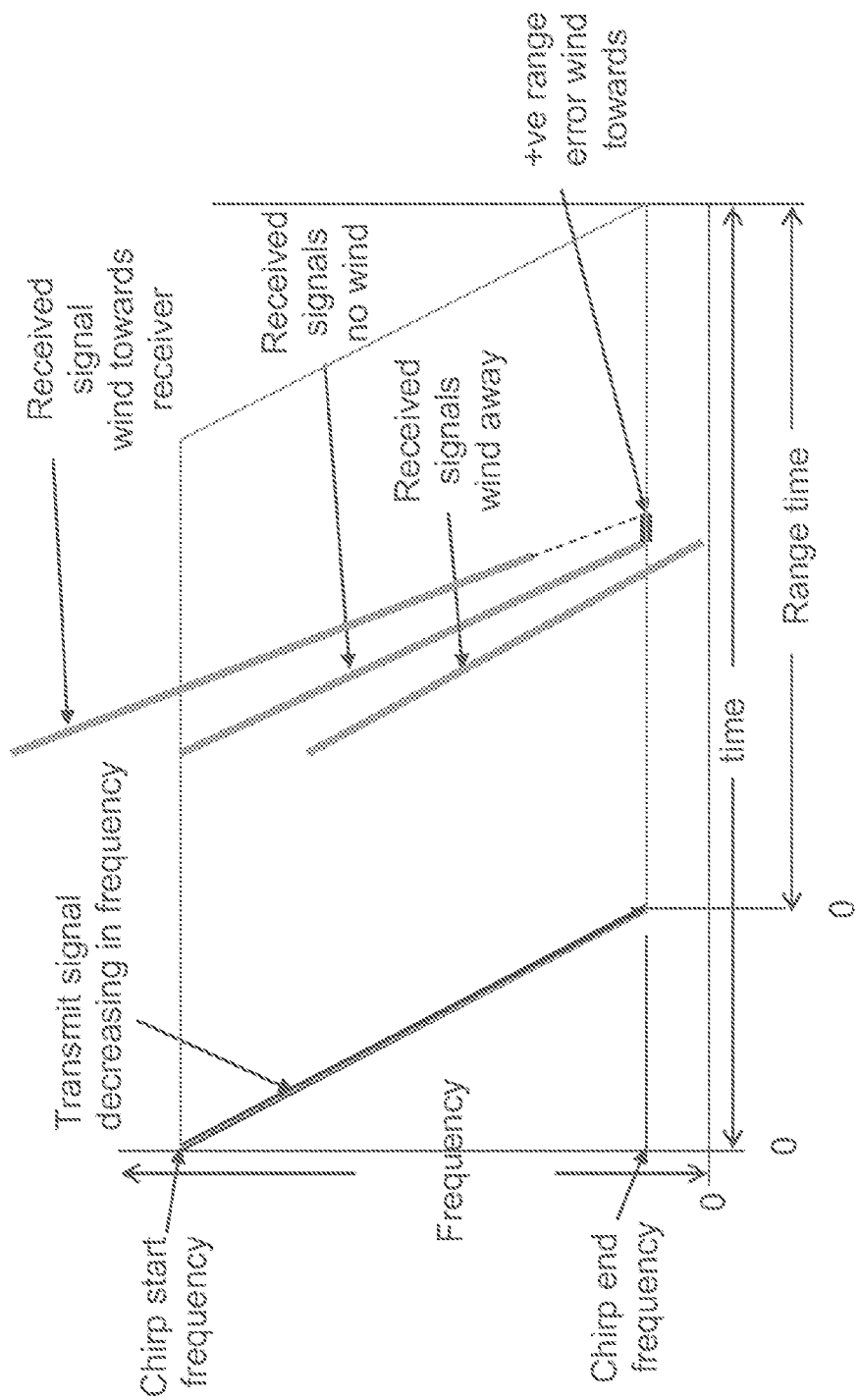
FIG. 17 shows a reverse chirp and the associated range and resolution errors.

The system may include an arrangement wherein the radial wind speed information is used to calculate an estimated frequency shift in the received signal at the chirp centre frequency, $f_D$ and then to reconstruct a new chirp that is representative of the actual frequencies received (see received signal in FIG. 16). The start frequency of the new chirp fSN is given by $$f_{SN} = f_S f_D / f_C \quad (14)$$

While the end frequency of the new chirp $f_{EN}$ is given by $$f_{EN} = f_E f_D / f_C \quad (15)$$

This new chirp can then be used to reprocess the received signal as if there was no frequency shift due to Doppler effects (see FIG. 1, second S(f)). The chirp reconstructed from the frequency estimates (equations 14 and 15) may then be used for multiplying the received chirp in the matched filter (FIG. 1) so that the multiplying chirp is now very closely "matched" to the actual received signal resulting in a minimization of resolution error.

The processing may include segmenting the received phase information into several height ranges and then using the average wind within that range to calculate the frequency shifts due to Doppler within the range so as to construct a new chirp for use in the matched filter that is closely "matched" to the actual received chirp signals so that resolution errors are minimized within that range. The residual phase output resulting from use of the adjusted chirp estimate in each range in the matched filter may provide an estimate of closeness of the fit of the adjusted chirp to the actual wind speed at that range.

The processing may also include a method of simply adding together or interpolating between each range segment over the height of the radial wind information to obtain a complete wind profile.

The system gain, range error and resolution for a system with a 15 degree offset antenna in 0 m/s horizontal wind are set out in Table 1 below.

TABLE 1

System gain, range errors and resolution.

| Bandwidth | Wind Speed | Gain | Range error | Resolution |
|---|---|---|---|---|
| 2 KHz | 0 m/s | 43 dB | 0 m | 0.085 m |

The above system works well at low wind speeds. However for higher wind speeds, system range and resolution errors will be greatly increased (refer equations 8 and 10).

It is clear from equation 8 that the range errors may be reduced by reducing the transmit pulse length and increasing the transmit chirp bandwidth while the resolution error (equation 10) may be improved by reducing the transmit pulse length. This is not always practical as a shorter transmit pulse will decrease system gain (equation 7). From a system gain point of view it is better to increase the transmit pulse length and bandwidth as this yields the greatest system gain. However it is evident from equations 8 and 10 that this will increase the range error and decrease the resolution.

Figure 4:
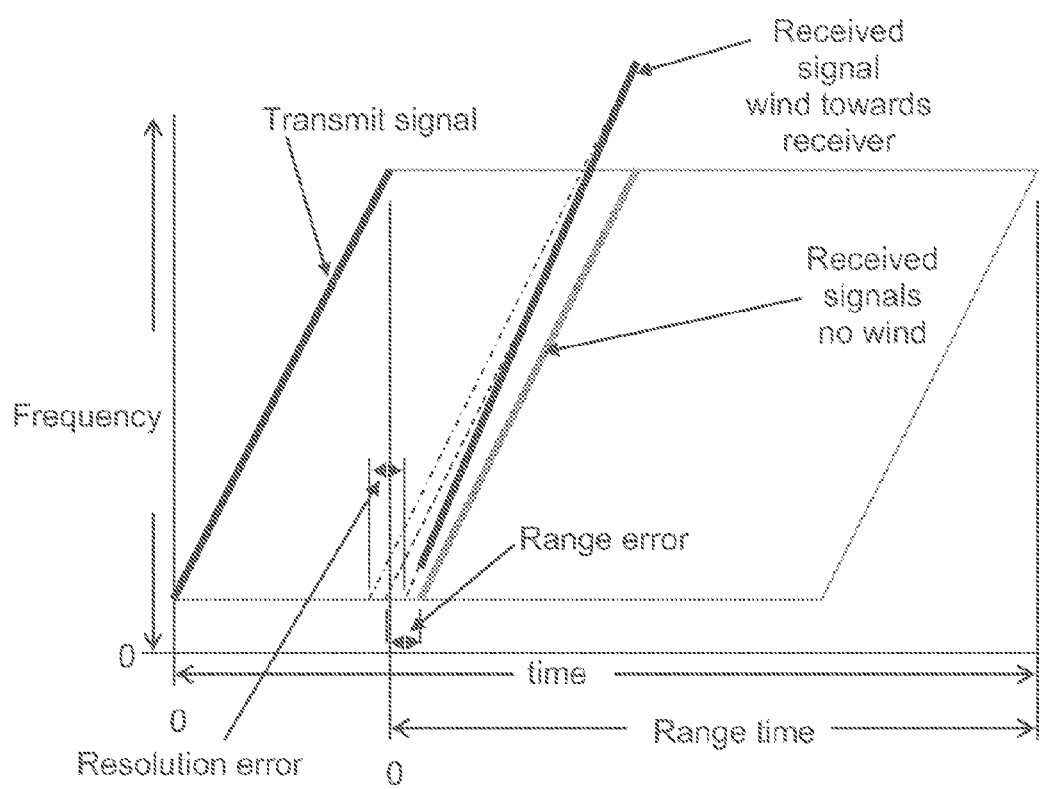
FIG. 4 shows range and resolution errors for a radial wind towards the receiver.

FIG. 4 shows range and resolution errors for a radial wind towards the receiver. For a radial wind away from the receiver the Doppler shift decreases the received frequencies so that the range error is in the opposite (increased range) direction.

The system gain, range error and resolution for a system with a 5 second transmit pulse operating over a frequency range of 700 Hz to 2.7 KHz (shown in FIG. 5) and a 15 degree offset antenna in 20 m/s horizontal wind are set out in Table 2 below.

TABLE 2

System gain, range errors and resolution.

| Bandwidth | Wind Speed | Gain | Range error | Resolution |
|---|---|---|---|---|
| 2 KHz | 20 m/s | 43 dB | 30 m | 37.5 m |

The system gain is maintained but for each point of received chirp signal, the signal is spread out over a distance of 37.5 m. The received point is also shifted in range so that a radial wind towards the receiver shifts the range towards the receiver resulting in a range error (refer equation 8).

The received chirp signal contains a wide range of frequencies which are all present at the receiver at the same time. This results in constructive and destructive interference between this wide range of frequencies, the amount of which is directly related to the chirp bandwidth.

The transmitted chirp signal is reflected back to the receiver from small scale turbulence in the atmosphere, the reflection being dependent on meeting the Bragg condition where the reflecting turbulence is close to a half wavelength of the transmitted signal. This means that at different frequencies, separate patches of turbulence reflect the transmitted signal resulting in a random phase offset at different frequencies within the chirp. When the received signal is passed through a matched filter all frequencies of the chirp are not correlated which results in a loss of system gain.

As Doppler shift of the received signal results in a shifting from its original frequency it appears to be from a different distance, either closer or further away depending on the direction of the wind and the resulting Doppler frequency (refer FIG. 4). As the Doppler shifted received signal has a different frequency slope than the transmitted signal, the output signal is spread out over a distance (refer Table 2 and FIG. 4) when the received Doppler shifted signal is applied to the matched filter receiver, resulting in a loss of resolution and a range error (refer FIG. 6).

FIG. 6 shows simulated range and resolution errors for horizontal wind speeds of 0 m/s, 1 m/s, 5 m/s and 20 m/s respectively with a 15 degree antenna offset angle. The resolution degrades as wind speed increases (0 dB signal-to-noise ratio at the input to the matched filter). The 0 m/s horizontal wind speed has no range or resolution error.

As frequency increases in the chirp, higher frequencies are attenuated more than lower frequencies due to propagation through the atmosphere. This attenuation is dependent on the humidity (refer FIG. 7).

Figure 7:
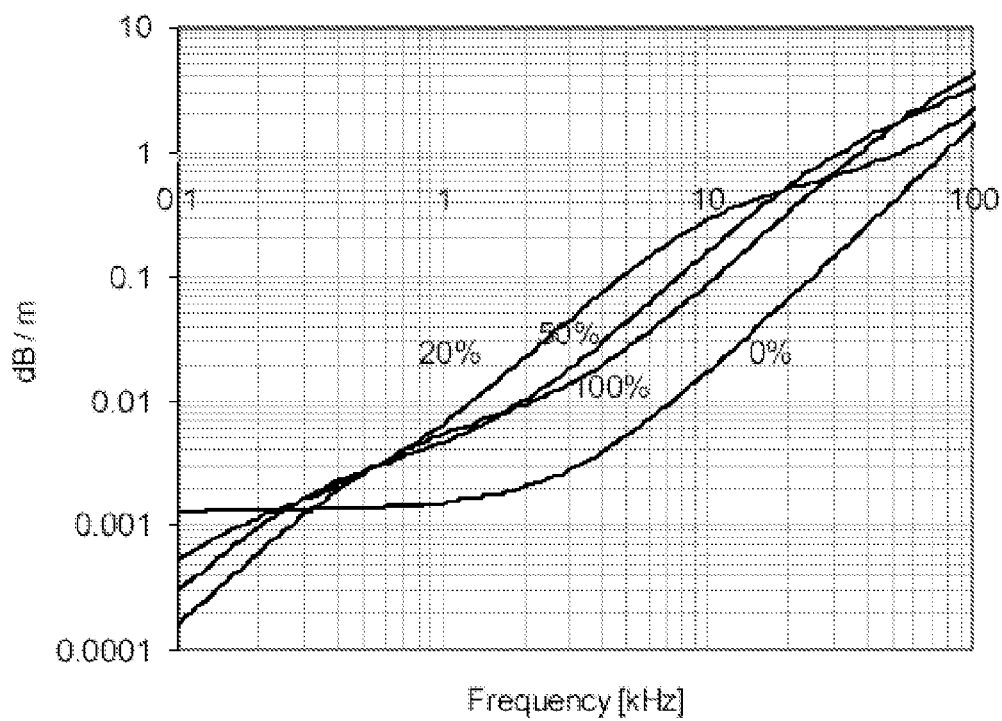
FIG. 7 shows atmospheric absorption at different frequencies for different values of Relative Humidity.

FIG. 7 shows atmospheric absorption (at T=293 degrees K) at different frequencies for different values of Relative Humidity.

For a range of frequencies between 700 Hz and 2.7 kHz and humidity between 50 and 100% the difference in attenuation between 700 Hz and 2.7 kHz over a range of 2000 m is about 24 dB more at 2.7 kHz. This difference in attenuation is fully compensated for by an increase in parabolic antenna gain between these frequencies (11.7 dB for each of the transmit and receiver antennas giving a total of 23.4 dB at 2.7 kHz) so that return signal levels may be independent of frequency.

As humidity decreases towards 20% attenuation at 2.7 kHz increases to 72 dB and an increase in antenna gain at 2.7 kHz is insufficient to compensate for this extra 48 dB loss. In this case greatly attenuated higher frequencies reduce performance of the matched filter as a much higher level of lower frequencies biases the result of the matched filtering to the extent that there is a loss of system gain.

Further to the above, the matched filter amplitude response may also be greatly compromised for humidity around 20% resulting in an inability to distinguish between different targets and making the output of the system poor.

Figure 8:
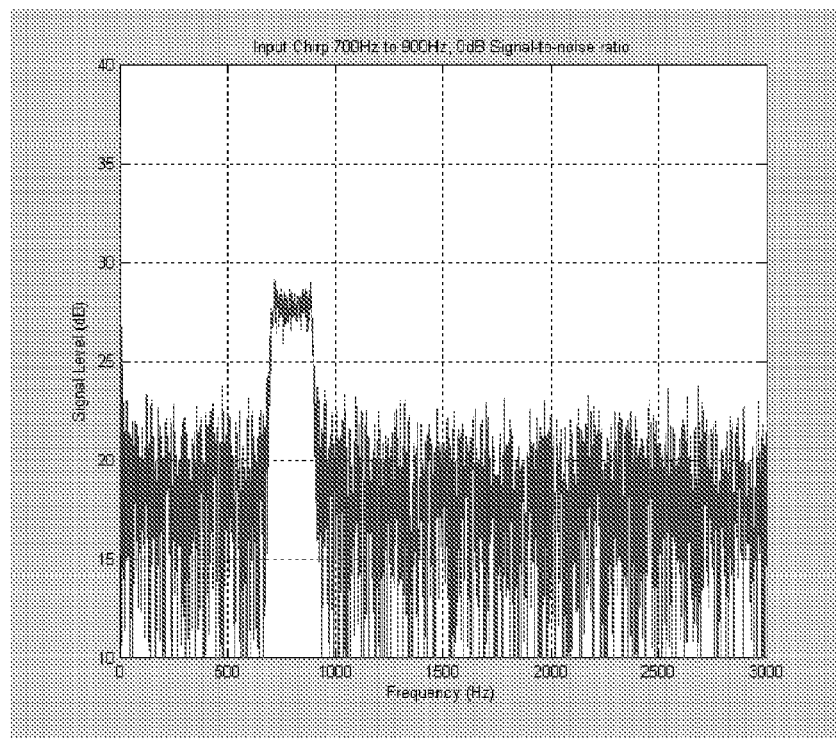
FIG. 8 shows an input chirp signal swept from 700 Hz to 900 Hz resulting from a transmitted chirp signal of 700 Hz to 900 Hz.
Figure 9:
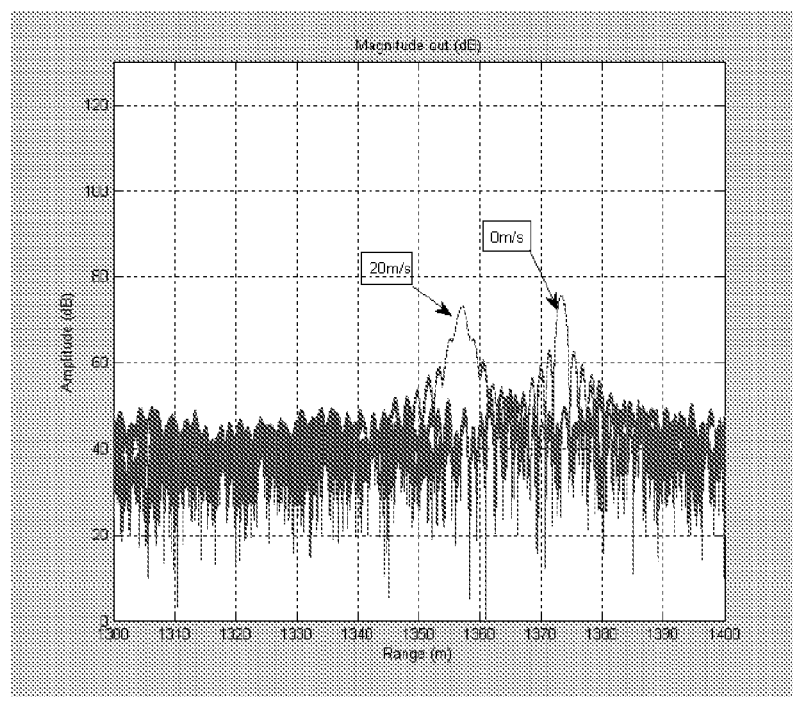
FIG. 9 shows range and resolution errors for horizontal wind speeds of 0 m/s and 20 m/s with a 15 degree antenna offset angle.

A narrow chirp Sodar according to the present invention may include a bandpass filter as shown in FIG. 8 and an output as shown in FIG. 9.

Figure 10:
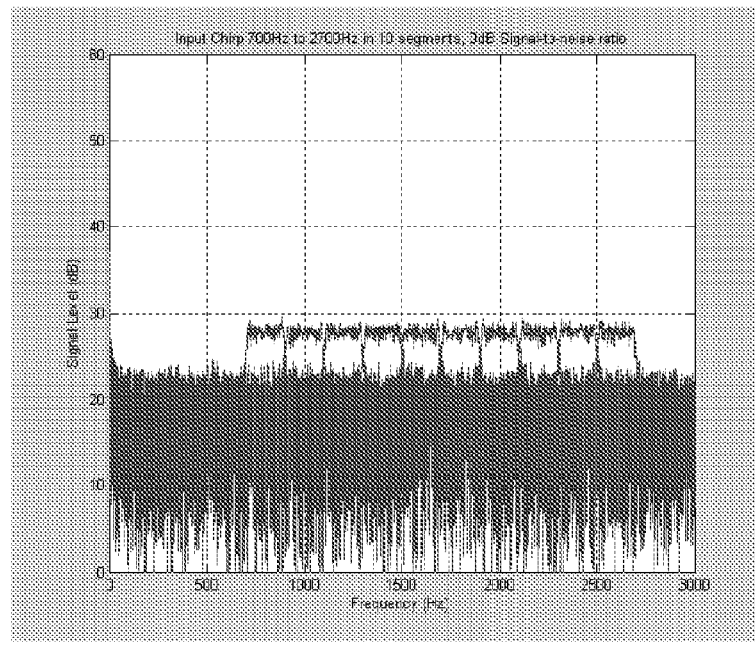
FIG. 10 shows a series of input chirp signals resulting from 10 transmitted chirp signals over a range of 700 Hz to 2.7 KHz prior to processing in a receiver matched filter.
Figure 11:
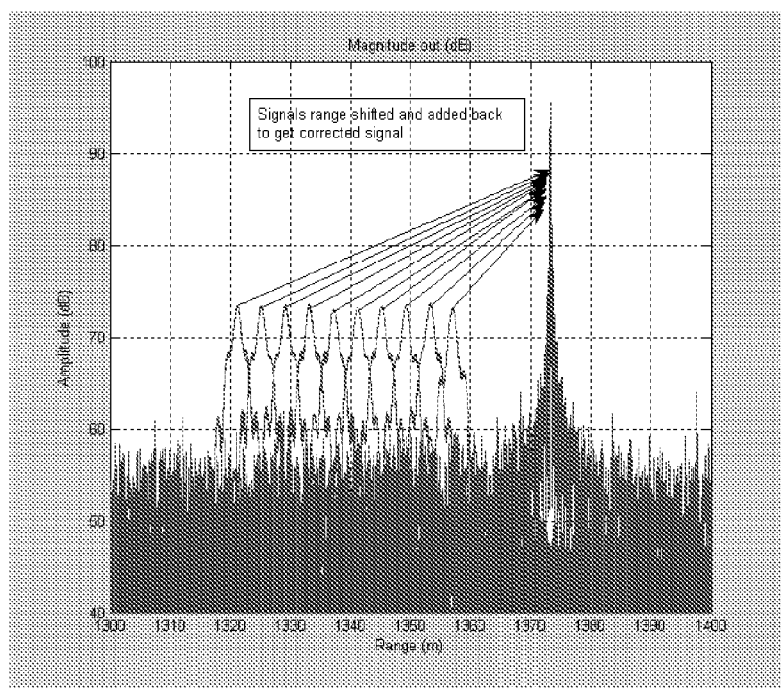
FIG. 11 shows signals at the output of the matched filter being range shifted using Doppler information so that they can be added back together to obtain a corrected signal.

FIG. 8 shows an input chirp signal resulting from a transmitted chirp signal, the frequency of which is swept from 700 Hz to 900 Hz. In an improved system according to the present invention, plural (eg. FIG. 10) pulse compression signals are transmitted and the bandpass filter includes plural filter bands (refer FIGS. 10 and 12) with outputs as shown in FIG. 11. In this case a matched filter is applied individually to each filter band of input to each generate an output as shown in FIG. 11. This approach includes the following advantages.

The return signal may be well correlated as it reflects from substantially the same patch of turbulence improving system gain for each filter band. Range error may not change (refer equation 5). Resolution may be improved by a factor of 10 (refer FIG. 8 and equation 8).

FIG. 9 shows simulated range and resolution errors of an improved system for horizontal wind speeds of 0 m/s and 20 m/s with a 15 degree antenna offset angle. It may be seen that resolution is improved by a factor of about 10 (0 dB signal-to-noise ratio at the input to the matched filter). The 0 m/s horizontal wind speed has no range or resolution error.

The effect of frequency dependent attenuation spread for humidity around 20% is reduced and a smaller bandwidth is better matched to the transmit signal as frequency related differential humidity attenuation is much smaller. Matched filter amplitude response is also greatly improved for humidity around 20% enabling better separation of closely spaced reflections.

System gain, range error and resolution for a system with a 0.5 second transmit pulse operating over a frequency range of 700 Hz to 900 Hz and a 15 degree offset antenna in 20 m/s horizontal wind are set out in Table 3 below.

TABLE 3

System gain, range error and resolution.

| Bandwidth | Wind Speed | Gain | Range error | Resolution |
|---|---|---|---|---|
| 200 Hz | 20 m/s | 23 dB | 30 m | 3.75 m |

Compared to the results in Table 2 system gain is reduced by 20 dB, (refer equation 4) and there is no improvement in range error. However resolution is improved by a factor of 10 from 37.5 m to 3.75 m. Although resolution as well as mutual interference and correlation are improved there is a substantial loss of system gain.

The method of the present invention includes transmitting a plurality of acoustic chirps having a relatively wide bandwidth in total such as 2 KHz each for a period of 0.5 seconds to add up to a longer period such as 5 seconds and then receiving each of the transmitted frequency segments before processing each frequency segment separately. 10 dB of the lost (20 dB) processing gain may be recovered by adding together the outputs from the processing of each frequency segment (refer FIG. 11). In this way the method of the present invention maintains the benefits associated with reduced transmit time and chirp bandwidth while also addressing lost gain.

Figure 12:
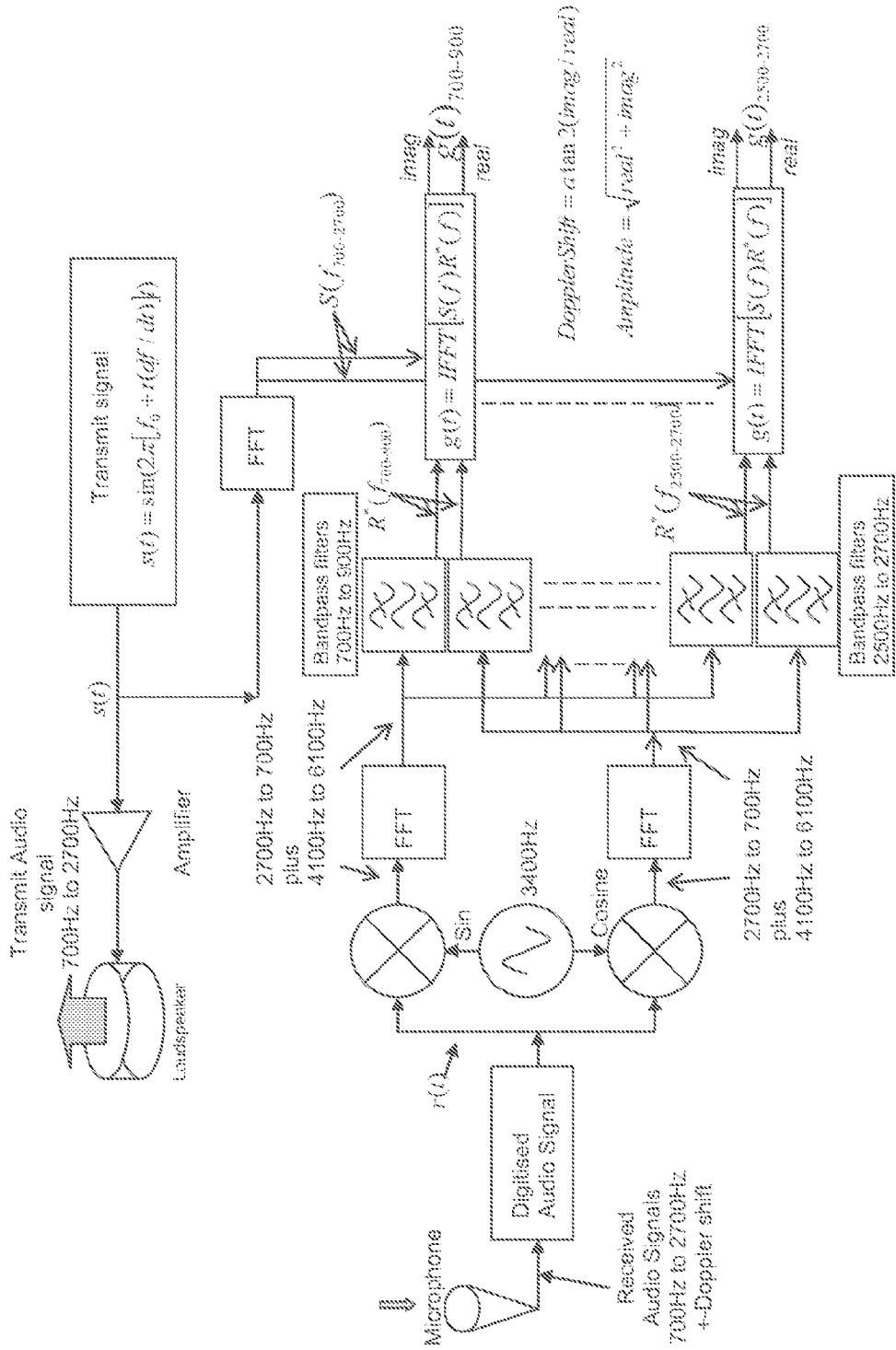
FIG. 12 shows an arrangement for frequency segmentation and matched filters for a forward chirp.

FIG. 10 shows each received chirp signal segment swept from 700 Hz to 2.7 KHz split into 10 frequency segments prior to processing in a matched filter associated with a receiver (refer FIG. 12).

Figure 14:
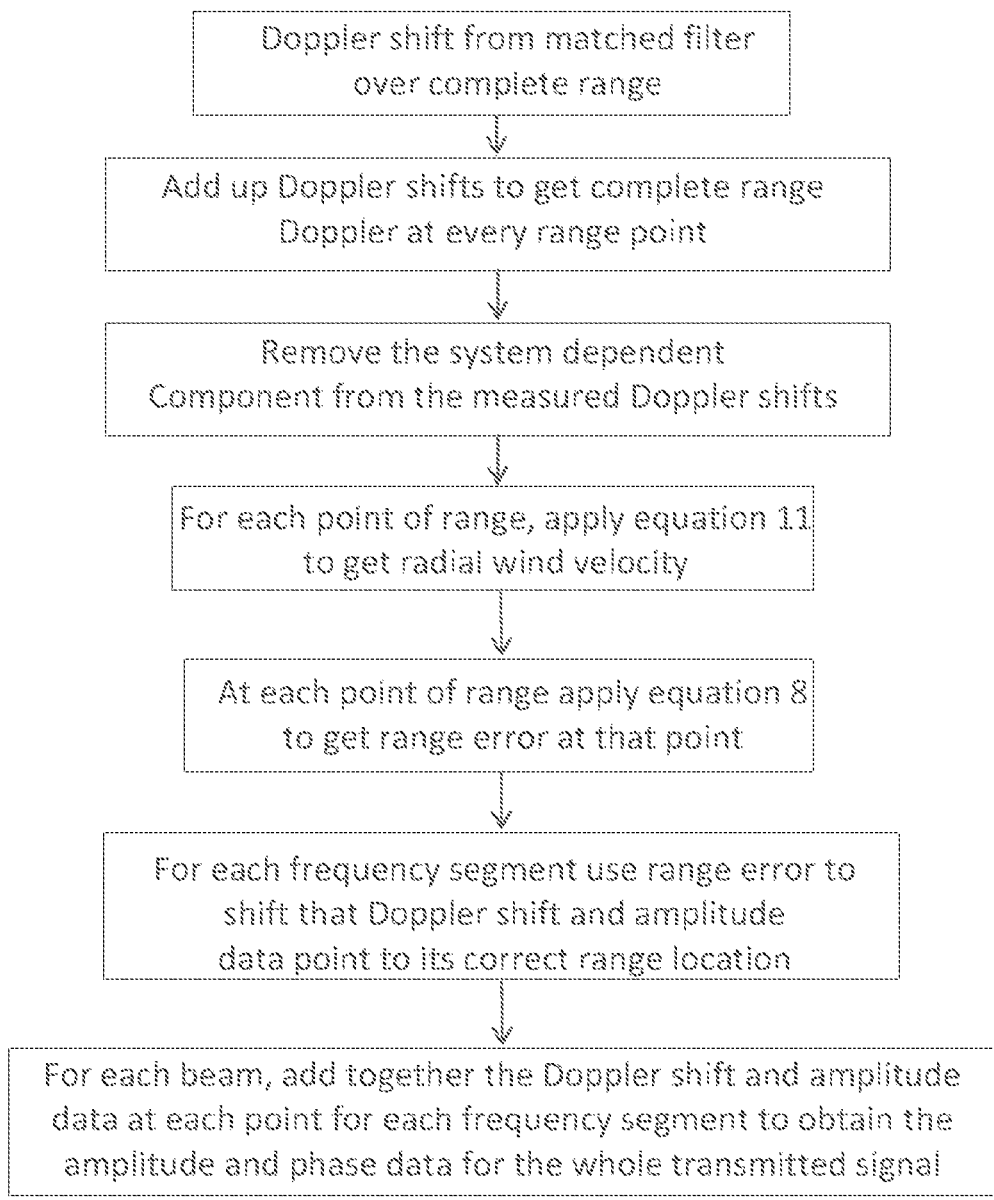
FIG. 14 shows a process for correcting Radial wind velocity and amplitude range data to its correct location and adding together corrected data for each segment to obtain data for a complete transmitted chirp signal.

A remaining problem to achieve full capability of the system is to align the outputs of the divided frequency segments when adding them up as they will have different center frequencies and thus different range errors (refer equation 8). Resolution for each frequency segment may be maintained if the outputs are added up with a correct range offset for each segment. The range error correction process is shown in FIG. 14 and should be carried out for each frequency segment on each beam.

System gain, range error and resolution for a system using a 5 second transmit pulse operating over a frequency range of 700 Hz to 2.7 KHz and a 15 degree offset antenna in 20 m/s horizontal wind with receive signal frequency segmentation and range error correction for each segment before adding are set out in Table 4 below (refer FIG. 11). The received signal is processed in ten segments. The processed outputs are added together and are corrected for range error in each segment before adding. As the chirp start frequency effectively changes with each segment processed, the range error also changes for each segment processed (refer equation 5). The gain is thus restored and the range error reduced to 0.

TABLE 4

| Bandwidth | Wind Speed | Gain | Range error | Resolution |
|---|---|---|---|---|
| 2 KHz | 20 m/s | 33 dB | 0 m | 3.75 m/s |

FIG. 11 shows the output from FIG. 12 with signals range shifted using Doppler information and then added together to obtain a corrected signal.

Figure 13:
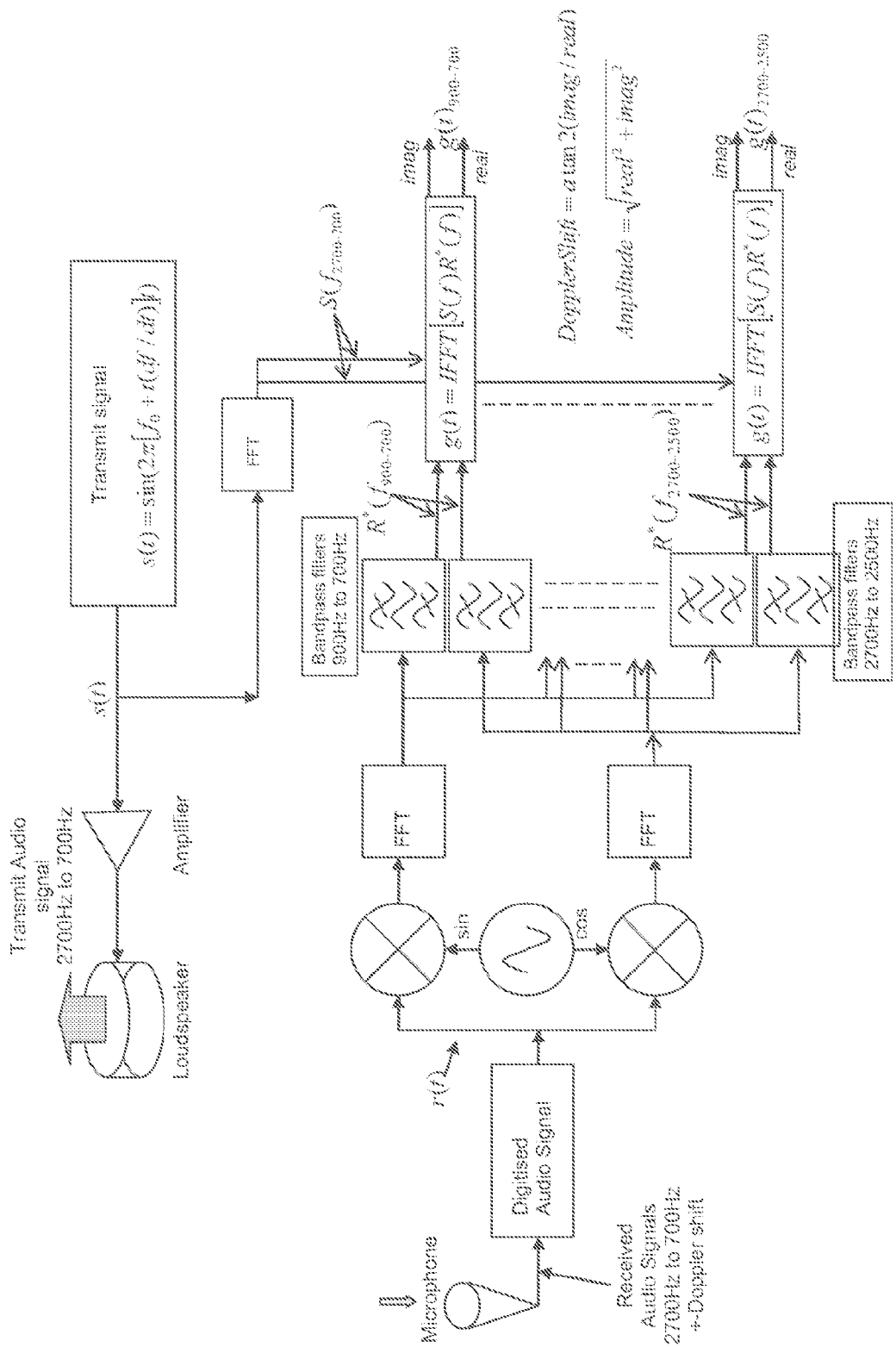
FIG. 13 shows an arrangement similar to FIG. 12 for a reverse chirp.

FIG. 12 shows an arrangement of frequency segmentation and individual matched filters for a forward chirp. The processing includes dividing the received signal into plural frequency segments and passing them through a plural multiplication in the frequency domain to form a plurality of matched filters, one for each frequency segment. Shown are frequency segments each of 200 Hz for a transmitted signal of 700 Hz to 2.7 KHz (f0 of 700 Hz, t of 5 seconds and df/dt of +400 Hz per second, forward chirp) (2 frequency segments show of 10). There are 10 output sets of Doppler shift and amplitude, one set for each 200 Hz frequency band. Reversed chirp signals could also be used as shown in FIG. 13. The range data of Doppler shift and amplitude information starts after a time equal to one complete transmit signal is sent, no valid data is available before this time. The received range information then continues until the end of the Range time (refer FIG. 2).

FIG. 14 shows a process for correcting Radial wind velocity and amplitude range data to its correct location and then adding together the corrected data for each segment to obtain data for the complete transmitted chirp signal.

In the application of equations 8 and 11 to FIG. 14, the values for the chirp time $t_T$, the center frequency of the chirp $f_C$, and the chirp bandwidth B must be adjusted to suit each frequency segment every time a range error is calculated.

Figure 15:
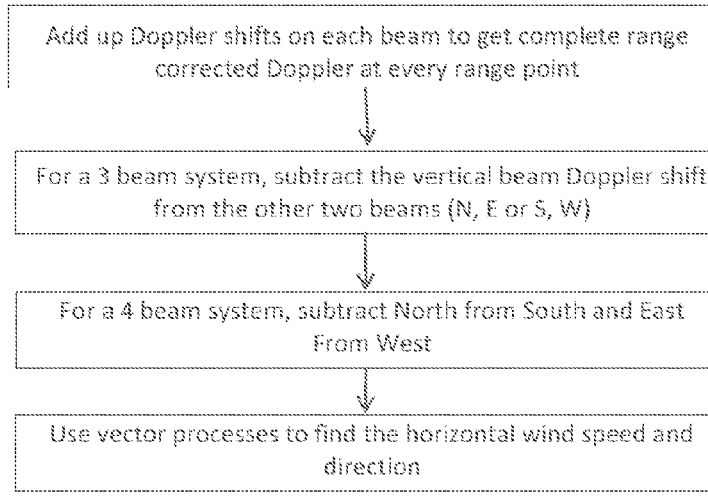
FIG. 15 shows a process for obtaining horizontal wind speed and direction once range for each point has been corrected.

FIG. 15 shows a process of obtaining horizontal wind speed and direction once range for each point has been corrected.

A system may be built by using three beams, North, East and Vertical, and measuring parameters independently from each beam, making corrections for each beam as outlined above, then subtracting the vertical wind speed for each of the North and East beams. Wind speed and direction can then be calculated from the North and East beams using standard vectors as shown in FIG. 15.

A four beam system (North, South and East, West) may also be used to great advantage as by subtracting opposite beams after range error correction, the vertical and system dependent components can be removed since they are common to the opposite beams. It may be shown that the horizontal wind component in opposite beams has an opposite sign so that subtraction adds up the Doppler shift due to the horizontal wind.

A preferred embodiment of the present invention may include the following steps:

1/Transmit acoustic chirps upwards into the atmosphere sequentially in several directions, for instance, North, South East, West and Vertical.

2/Receive reflected acoustic chirp signals on several beams, one for each direction North, South East, West and Vertical.

3/Process each beam in a matched filter so as to obtain a series of range gates containing amplitude and phase information.

4/Obtain a Doppler phase shift at each range gate, on each beam.

5/Use equation 8 to find a range error for each range gate.

6/Shift the range gate to its correct position so as to obtain a range corrected profile.

7/Use equations 14 and 15 to find a new chirp for each range gate with which to reprocess the received data.

8/Apply range correction to each resolution corrected range gate to obtain wind speed at a correct height for each beam. At this point the Doppler shift may contain a vertical wind component as well as a horizontal wind component. The vertical wind component should now be removed from each of the North, South East and West beams before the horizontal wind can be correctly calculated.

Finally, it is to be understood that various alterations, modifications and/or additions may be introduced into the constructions and arrangements of parts previously described without departing from the spirit or ambit of the invention.

The invention claimed is:

1. A method of improving performance of a Sodar system adapted to locate discontinuities in the atmosphere by transmitting pulse compression signals such as plural acoustic chirps, said method comprising: transmitting the acoustic chirps; receiving acoustic echoes of the chirps; and processing the acoustic echoes to provide an indication of said discontinuities; wherein said processing includes correcting range error associated with the acoustic echoes, and wherein the step of correcting range error is performed at each of a plurality of range segments and including adding together outputs of the corrected range segments to provide a corrected range profile.

2. A method according to claim 1 wherein bandwidth of each chirp is 200 Hz and bandwidth of the plural chirps is 2 kHz in total.

3. A method according to claim 1 wherein said processing includes correcting resolution error associated with the acoustic echoes.

4. A method according to claim 3 wherein the step of correcting resolution error is performed at each of a plurality of range segments and including adding together outputs of the corrected resolution segments to provide a corrected range and resolution profile.

5. A method of improving performance of a Sodar system adapted to locate discontinuities in the atmosphere by transmitting pulse compression signals such as plural acoustic chirps, said method comprising: transmitting the acoustic chirps;
receiving acoustic echoes of the chirps; and
processing the acoustic echoes to provide an indication of said discontinuities; wherein said processing includes correcting resolution error associated with the acoustic echoes.

6. A method according to claim 5 wherein bandwidth of each chirp is 200 Hz and bandwidth of the plural chirps is 2 kHz in total.

7. A method according to claim 5 wherein the step of correcting resolution error is performed at each of a plurality of range segments and including adding together outputs of the corrected resolution segments to provide a corrected resolution profile.

8. A method according to claim 1 wherein said processing includes passing each range segment through a respective matched filter and correcting range error for each output from each respective matched filter.

9. A method according to claim 8 wherein each matched filter provides an amplitude and Doppler phase output and including the step of shifting each amplitude and Doppler phase output to its correct range.

10. A method according to claim 9 including the step of aligning the amplitude and Doppler phase outputs from each matched filter after range correction.

11. A method of improving performance of a Sodar system adapted to locate discontinuities in the atmosphere by transmitting pulse compression signals such as plural acoustic chirps, said method including:
transmitting said acoustic chirps in plural frequency segments;
receiving echoes of said acoustic chirps in plural frequency segments;
processing each frequency segment to provide an output for each segment; and
summing said outputs of said frequency segments to provide an indication of said discontinuities.

12. A method according to claim 11 wherein bandwidth of each chirp is 200 Hz and bandwidth of the plural chirps is 2 kHz in total.

13. A method according to claim 11 wherein said processing includes passing each frequency segment through a respective matched filter and correcting range error for each output from each respective matched filter.

14. A method according to claim 13 wherein said chirps are transmitted on opposite beams to enable subtraction of the opposite beams after correcting the range error.

15. A method according to claim 1 wherein forward and reverse chirps are transmitted on opposite beams.

16. A method according to claim 1 wherein forward and reverse chirps are transmitted on multiple beams and on different frequency bands.

17. A method according to claim 13 wherein each matched filter provides an amplitude and Doppler phase output and including shifting each amplitude and Doppler phase output to its correct range.

18. A method according to claim 17 including the step of aligning the amplitude and Doppler phase outputs from each matched filter after range correction.

* * * * *

UNITED STATES PATENT AND TRADEMARK OFFICE
CERTIFICATE OF CORRECTION

| | |
|---|---|
| PATENT NO. | : 9,696,423 B2 |
| APPLICATION NO. | : 14/432450 |
| DATED | : July 4, 2017 |
| INVENTOR(S) | : Andrew Louis Martin |

It is certified that error appears in the above-identified patent and that said Letters Patent is hereby corrected as shown below:

On the Title Page

Item (73) Assignee should read WINDBIDCO PTY LTD

Signed and Sealed this
Fifth Day of September, 2017

Joseph Matal
*Performing the Functions and Duties of the*
*Under Secretary of Commerce for Intellectual Property and*
*Director of the United States Patent and Trademark Office*